United States Patent [11] 3,628,976

[72] Inventor Emil Stocker
 Riehen, Switzerland
[21] Appl. No. 771,357
[22] Filed Oct. 28, 1968
[45] Patented Dec. 21, 1971
[73] Assignee Ciba-Geigy AG
 Basel, Switzerland
[32] Priority Nov. 3, 1967
[33] Switzerland
[31] 15447/67

[54] PROCESS OF MAKING PERYLENE PIGMENTS
 13 Claims, No Drawings
[52] U.S. Cl. .................................................. 106/288 Q,
 106/308 F, 106/308 N, 106/308 Q, 260/345.2
[51] Int. Cl. ........................................................ C09c,
 C09c 3/02
[50] Field of Search ............................................ 260/345.2;
 106/288 Q, 309, 308 F, 308 N, 308 Q

[56] References Cited
 UNITED STATES PATENTS
2,982,666 5/1961 Chun et al. .................. 106/308 Q
3,094,499 6/1963 Gassmann et al. ............ 106/308 Q
3,337,360 8/1967 Schonbach .................... 106/308 N FOREIGN PATENTS
976,084 11/1964 Great Britain ................ 106/308 N
859,228 1/1961 Great Britain ................ 260/345.2

OTHER REFERENCES
Porai-Koshits et al., Chemical Abstracts, vol. 42, cols. 5892- 3 (1948) QD 1A51

Primary Examiner—Tobias E. Levow
Assistant Examiner—H. M. S. Sneed
Attorney—Wenderoth, Lind & Ponack ABSTRACT: A process of making a strongly colored, pure and transparent perylene-3,4,9,10-tetracarboxylic acid pigments, comprising precipitating raw perylene pigment from the aqueous solution of a salt thereof in the presence of a dispersing agent, especially rosin soap, in amounts of 10 to 20 percent by weight calculated on the weight of the perylene pigment at a temperature of about 70°–100° C. by the addition of a mineral acid or an organic acid is described. Dependent on the nature of the acid there is obtained a red pigment (mineral acid) or a brown pigment (organic acid).

Thus conditioned perylene pigments are useful for pigmenting of raw materials for lacquers, of stoving lacquers, and for synthetic thermoplastic materials, especially polyvinyl chloride.

PROCESS OF MAKING PERYLENE PIGMENTS

DETAILED DISCLOSURE

The present invention concerns strongly colored, transparent perylene pigments, a process for the production thereof, their use for the pigmenting of raw materials for lacquers and of synthetic thermoplastic materials as well as an industrial product, the material pigmented therewith.

Successful pigmenting with pigments presupposes that the pigment is in a particularly finely dispersed stable form. Pigments are generally converted into a finely dispersed form by reprecipitating, e.g., from sulfuric acid, milling with milling auxiliaries which can subsequently be removed or by recrystallization from suitable solvents. However, perylene pigments, particularly perylene-3,4,9,10-tetracarboxylic acid dianhydride pigments, are obtained in this way the color strength and/or purity of which do not meet present day requirements for pigments. Sometimes, also their dispersibility in raw materials for lacquers is unsatisfactory. In addition, their transparency does not meet requirements for certain purposes such as dyeing of metal-effect finishes, transparent lacquers and films or synthetic leather.

A novel process has now been found by which perylene pigments are obtained in which, surprisingly, are simultaneously combined the desired valuable properties such as purity, great color strength, good dispersibility, very good fastness to light and weathering and high transparency. In addition, the desired pigments can be produced in a simple way during a usual purification process from the crude substances without a hitherto usual additional step for the conditioning being necessary. This process is characterized by precipitating the perylene pigment from the aqueous solution of a salt of perylene-3,4,9,10-tetracarboxylic acid in the presence of a dispersing agent.

Suitable dispersing agents are anion active, nonionic and cation active compounds. They are used, advantageously, in an amount of at least 0.2 percent by weight, calculated on the weight of the tetracarboxylic acid.

The following can be mentioned, for example, as anion active dispersing agents usable according to the invention:

1. the sodium, potassium, ammonium, N-alkyl-, N-hydroxyalkyl-, N-alkoxyalkyl- or N-cyclohexyl- ammonium or hydrazinium or morpholinium salts of fatty acids having 10 to 20 carbon atoms termed as soaps such as lauric, palmitic, stearic or oleic acid, such salts, of naphthenic acids, of resin acids, such as abietic acid, particularly however, the so-called rosin soaps;
2. sulfated primary or secondary entirely aliphatic alcohols the alkyl chain of which has eight to 18 carbon atoms, e.g., sodium lauryl sulfate, sodium-$\alpha$-methylstearyl sulfate, sodium tridecyl sulfate, sodium oleyl sulfate, potassium stearyl sulfate or the sodium salts of coconut fatty alcohol sulfates;
3. sulfated unsaturated higher fatty acids or fatty acid esters such as oleic acid, elaidic acid or ricinoleic acid or their low alkyl esters, e.g., ethyl, propyl or butyl ester, and the oils containing such fatty acids such as olive oil, castor oil, rape oil, etc.;
4. sulfated ethyleneoxy adducts such as sulfated addition products of 1 to 10 mols of ethylene oxide to fatty acid amides, mercaptans or amines, particularly however, to fatty acids, aliphatic alcohols or alkyl phenols having eight to 20 carbon atoms in the alkyl chain, e.g., to stearic acid, oleic acid, lauryl alcohol, myristyl alcohol, stearyl alcohol, oleyl alcohol, octyl phenol or nonyl phenol;
5. sulfates of N-acylated alkanolamines, e.g., the sulfated amides of caprylic, pelargonic, capric, lauric, myristic or stearic acid or of low fatty acids substituted by alkylphenoxy groups such as octyl- or nonyl- phenoxyacetic acid, with mono- or bis- hydroxyalkylamines such as $\beta$-hydroxyethylamine, $\gamma$-hydroxypropylamine, $\beta$, $\gamma$-dihydroxypropylamine, bis-($\beta$-hydroxyethyl)-amine or with N-alkyl-N-hydroxyalkyl amines such as N-methyl- or N-ethyl- N-($\beta$-hydroxyethyl)-amine;
6. sulfated esterified polyoxy compounds, e.g., sulfated, partially esterified polyvalent alcohols such as the sodium salt of the sulfated monoglyceride of palmitic acid;
7. primary and secondary alkyl sulfonates the alkyl chain of which contains 10 to 20 carbon atoms, e.g., sodium dodecyl sulfonate, sodium hexadecane sulphonate-8, sodium stearyl sulfonate;
8. alkylaryl sulfonates such as alkylbenzene sulfonates having a straight or branched alkyl chain of at least seven carbon atoms, e.g., sodium dodecylbenzene sulfonate, 1,3,5,7-tetramethyl octylbenzene sulfonate, sodium octadecylbenzene sulfonate; such as alkylnaphthalene sulfonates, e.g., sodium-1-isopropyl naphthalene-2-sulphonate, sodium dibutyl naphthalene sulfonate; or such as dinaphthyl methane sulfonates, e.g., the disodium salt of di-(6-sulphonaphthyl-2)-methane;
9. sulfonates of polycarboxylic acid esters, e.g., sodium dioctyl sulphosuccinate, sodium dihexyl sulphophtalate.

Also esters with other polyvalent mineral acids, e.g., phosphates, can be used instead of the sulfates.

The following can be mentioned, e.g., as nonionic dispersing agents usable according to the invention:

1. addition products of alkyleneoxides, particularly of ethyleneoxide, to higher fatty acids, fatty acid amides, aliphatic alcohols, mercaptans or amines, to alkyl phenols or alkylthio phenols the alkyl radicals of which contain at least seven carbon atoms. Polyglycol monoalkyl phenyl ethers having 2 to 20, optionally substituted, glycol units, the alkyl group of which contains eight to 12 carbon atoms, such as tri-(1,2-propylene glycol)-mono-nonyl phenyl ether, pentaethylene glycol mono-octyl phenyl ether or deca-ethylene glycol mono-nonyl phenyl ether are preferred;
2. esters of polyalcohols, particularly monoglycerides of fatty acids having 12 to 18 carbon atoms, e.g., the monoglycerides of lauric, stearic or oleic acid;
3. N-acylated alkanolamines of the same type as mentioned regarding the sulfates of these compounds, thus for example, the N,N-bis-($\omega$-hydroxyalkyl)-amides of the acid mixtures embraced by the generic term "coconut oil fatty acids," mainly N,N-bis-($\beta$-hydroxyethyl)- or N,N-bis-($\gamma$-hydroxypropyl)-amides, also the addition products of ethylene oxide to these N-acylated alkanolamines;
4. reaction products of higher fatty acids with an alkanolamine, the molecular ratio of alkanolamine to fatty acid being greater than 1, e.g., 2. As fatty acids, mainly those having eight to 18 carbon atoms, as well as the mixtures termed coconut oil fatty acids, are used. Diethanolamine in particular is meant by alkanolamines. Such substances are described in U.S. Pat. No. 2,089,212. These compounds are not uniform and some have cation active character.

As cation-active dispersing agents usable according to the invention, in addition to these mixtures last mentioned above, also quaternary ammonium salts such as trimethylphenyl ammonium chloride or quaternized alkyl ammonium polyglycol ethers such as are described in Swiss Pat. No. 409,991, alkyl pyridinium salts such as cetyl pyridinium chloride, or imidazolinium salts such as 1-methyl-1-hydroxyethyl-2-heptadecenyl-imidazolinium methyl sulfate, are meant.

The technically accessible dispersing agents of the classes mentioned are mostly not uniform products but mixtures of homologues of the compounds mentioned.

Anion-active and/or nonionic dispersing agents, in particular, soaps, sulfates of higher alkanols, monoglycerides of fatty acids or polyglycol monoalkylphenyl ethers, chiefly however, rosin soaps are preferred.

Water soluble salts of perylene-3,4,9,10-tetracarboxylic acid are, e.g., the sodium, potassium and ammonium salts. These salts are obtained, e.g., by saponifying the corresponding diimide with concentrated sulfuric acid at about 215° C. and dissolving the isolated raw product obtained in aqueous alkaline solution or, optionally by heating the crude or the purified or otherwise conditioned perylene-3,4,9,10-tetracarboxylic acid dianhydride in aqueous alkaline solution. The alkaline solution is clarified if necessary and at least 0.2 percent by weight, preferably however, 2 to 40 percent by weight and optimally 10 to 20 percent by weight calculated on the weight of the tetracarboxylic acid, of dispersing agent are added. The solution is then so strongly acidified with an acid while stirring that the perylene pigment precipitates. The acid can be added at 20°–100° C., preferably however, at 70°–100° C. A mineral acid, e.g., hydrochloric or sulfuric acid, or an organic acid, e.g., acetic acid, trichloracetic acid, benzene- or toluenesulphonic acid is added depending on the shade of the perylene pigment desired. Mainly red shades are obtained with mineral acids; principally brown shades are obtained with organic acids. The suspension formed is then advantageously stirred for another 20 minutes to 2 hours at 70°–100° C., the perylene pigment obtained is filtered off, washed neutral with water and dried. After the dried product has been milled, the pigment is in a finely distributed form which is ready for use. Optionally, drying can be performed by freeze or spray drying of a concentrated aqueous pigment suspension.

The pigments in finely distributed form are suitable for the pigmenting of raw materials for lacquers and of synthetic thermoplastic materials in red to brown shades. As examples can be mentioned: cellulose derivatives such as nitrocellulose, cellulose acetates, cellulose acetate butyrate mixed esters, rubber, polyvinyl chloride, polyethylene, polypropylene, polyvinyl acetate, polyacrylonitrile, polyacrylic and polymethacrylic acid esters, polystyrene, acrylate-butadiene-styrene terpolymers, polyesters of the ethylene glycol terephthalic acid polycondensate type or unsaturated polyester resins such as maleinate resins; also alkyd resins, particularly oil modified, vinyl, methacrylic and epoxyd resins, as well as thermoplastic and curable acrylic resins, urea- and melamine-formaldehyde resins, the condensation products of phenols, amines and amides with formaldehyde. Pigments obtained according to the invention are particularly suitable for the pigmenting of stoving lacquers based on curable or thermoplastic acrylic resins or melamine-formaldehyde condensates as well as for the pigmenting of hard or plasticized polyvinyl chloride plastics.

The perylene pigments produced according to the invention are added to these polymeric materials, e.g., by mixing the pigment with them using mixing rollers, mixing or milling apparatus. To reduce brittleness, the usual softeners, e.g., esters of phthalic, sebacic or phosphoric acid, can be worked into the macromolecular substances before or after incorporation of the pigment dyestuff. It is also possible, in order to attain qualitative or optical effects, to add fillers or other coloring components such as white, colored or black pigments or metal bronzes to the polymers. Another possible method of incorporating the pigment consists in converting the pigment, combined with auxiliaries such as rubber, plasticizer, e.g., dioctyl phthalate, natural and synthetic resins, cellulose derivatives, e.g., nitrocellulose, by known methods into concentrates, master batches, chips, granualtes or similar preparations which can be particularly easily worked up into the materials to be pigmented.

In general, the pigmented raw materials for lacquers and the synthetic thermoplastic materials contain amounts of 0.01 to 10 percent by weight of perylene pigment, calculated on the starting material to be pigmented. The amount of pigment to be chosen depends primarily on the color strength desired, also on the thickness of the shaped article and finally, optionally, also on the content of white pigment in the polymer.

Compared with previously known processes, the process according to the invention allows perylene pigments consisting essentially of the anhydride of perylene-3,4,9,10-tetracarboxylic acid to be produced in the course of the usual dyestuff production without an additional conditioning operation, which perylene pigments have excellent purity, color strength, dispersibility and especially transparency. The materials pigmented therewith are distinguished by their very good fastness to overlacquering, migration and abrasion, in particular by their excellent fastness to light and weathering, even when the concentrations of pigment are slight, and by their stability to heat. As the pigmented materials in addition have good transparency, the pigments produced according to the invention are particularly suitable for the production of red to brown metal-effect finishes for which there is a great demand today in the automobile industry.

The aqueous solution containing the starting pigment, and which contains also the dispersing agent, or to which the dispersing agent is added prior to precipitation of the final pigments according to the invention, should have a pH-value of at least about 7 or higher and preferably a pH-value of about 10 to 14.

The following nonlimitative examples illustrate the invention. The temperatures are given therein in degrees Centigrade.

EXAMPLE 1

23.6 g. of crude perylene-3,4,9,10-tetracarboxylic acid dianhydride are added while stirring to a mixture of 720 ml. of water and 38.4 g. of 30 percent aqueous sodium hydroxide solution. The suspension is heated to 45° whereupon the sodium salt of perylene-3,4,9,10-tetracarboxylic acid is formed and a solution is obtained. As soon as the solution becomes clear, rosin soap, produced by dissolving 2.36 g. of colophonium in 12 ml. of water and 1.12 g. of 30 percent aqueous sodium hydroxide solution at 95°, is added. The solution is then heated to 85° and, at 85° to 90°, 43.8 g. of 30 percent hydrochloric acid are added dropwise within 10 minutes. The precipitated pigment suspension is stirred for another 30 minutes at 97°–100°, filtered off hot, washed neutral with water and dried at 100°. After pulverizing, a finely distributed red pigment dyestuff is obtained. On incorporation into stoving lacquers, a red shade is obtained with this pigment which is distinguished by very great color strength, purity, transparency as well as by good fastness to overlacquering, heat and light. The pigment has considerably better color strength when compared with a pigment produced in an analogous manner without the addition of rosin soap and it has considerably greater transparency than a pigment obtained according to Swiss Pat. No. 384,204, example 1, paragraph 2, by reprecipitating perylene-3,4,9,10-tetracarboxylic acid dianhydride from sulfuric acid. Also, in light shades in combination with a white pigment or with aluminum bronze, the fastness to weathering of the stoving lacquers obtained is excellent.

A pigment having similarly good properties is obtained by freeze or spray drying of a concentrated aqueous suspension of the pigment which has been filtered off hot.

EXAMPLE 2

3.92 g. of perylene-3,4,9,10-tetracarboxylic acid dianhydride are dissolved in 125 ml. of water and 25 ml. of 2N sodium hydroxide solution by heating the suspension to 50° and then adding a solution, prepared hot, of 0.4 g. of stearic acid in 20 ml. of water and 1 ml. of 2N sodium hydroxide solution thereto. The solution of the sodium salt of the perylene-3,4,9,10-tetracarboxylic acid is heated to 93°–95° while stirring and 50 ml. of 2N hydrochloric acid are added dropwise within 10 minutes. The precipitated pigment suspension is then stirred for another hour at this temperature, the evaporated water always being replaced, after which it is filtered off hot, washed neutral with water and dried at 80°. After milling, it is a finely distributed red powder and has similarly good properties as the product produced according to example 1.

Red pigments having similarly valuable properties are obtained if, with otherwise the same procedure as given in the example, 0.4 g. of oleic acid, 0.4 g. of naphthenic acid or 0.085 g. of abietic acid are used instead of stearic acid.

EXAMPLE 3

If, instead of 0.4 g., 2.0 g. of naphthenic acid, dissolved in 100 ml. of water of 50° and 5 ml. of 2N sodium hydroxide solution are used with otherwise the procedure given in example 2, then a finely distributed red pigment is obtained which can be dispersed very well in plasticized polyvinyl chloride.

EXAMPLE 4

19.5 g. of perylene-3,4,9,10-tetracarboxylic acid diimide are added, while stirring, to 195 g. of concentrated, 215° hot sulfuric acid, the addition being made within 15 minutes, whereupon the reaction mixture is stirred for another 130 minutes at this temperature. After cooling to room temperature, the precipitate is filtered off on a glass filter, washed with 75 g. of concentrated sulfuric acid, well filtered under suction, slurried in 1,500 ml. of water while stirring and dissolved by the addition of 62.5 g. of potassium hydroxide. After heating the solution of the potassium salt of perylene-3,4,9,10-tetracarboxylic acid to 90°, undissolved impurities are filtered off hot and, at 50°, rosin soap, obtained by dissolving 1.5 g. of colophonium in 10 ml. of water and 2.7 ml. of 2N sodium hydroxide solution at 90°, is added to the filtrate. While stirring at 85°–90°, the perylene pigment is precipitated by the dropwise addition of 100 ml. of 10 N hydrochloric acid within 5 minutes. The suspension obtained is stirred for another 30 minutes at 85°, then filtered, the residue is washed neutral and dried at 100°. After pulverizing, a red, finely dispersed pigment powder is obtained. It is excellently suitable for the pigmenting of stoving lacquers and produces strongly colored red shades of good transparency.

Without the addition of the rosin soap solution, a pigment is obtained which, reduced with white pigments, is much less strongly colored and duller.

EXAMPLE 5

0.4 g. of the sodium salt of a condensation product of naphthalene sulfonic acid and formaldehyde dissolved in 20 ml. of water are added to a 50° warm solution obtained by heating 3.92 g. of perylene-3,4,9,10-tetracarboxylic acid dianhydride, produced according to Swiss Pat. No. 384,204, example 1, paragraph 2, in 125 ml. of water and 25 ml. of 2N sodium hydroxide solution. The solution of the perylene tetracarboxylic acid is heated, while stirring, to 93°–95° and 50 ml. of 2N hydrochloric acid are added dropwise within 10 minutes. After heating for a further hour, the precipitated pigment is filtered off hot, washed neutral with water and dried at 80°. A finely distributed red pigment dyestuff is obtained by milling. It is suitable for the pigmenting of stoving lacquers containing aluminum bronze. The stoving lacquers have great color strength, excellent transparency, very good fastness to overlacquering and heat and excellent fastness to light and weathering. The transparency of the starting product is very greatly improved by the treatment described.

EXAMPLE 6

3.92 g. of perylene-3,4,9,10-tetracarboxylic acid dianhydride are dissolved, in the form of the sodium salt of perylene-3,4,9,10-tetracarboxylic acid, in 180 ml. of 50° hot water and 25 ml. of 2N sodium hydroxide solution. A solution of 2.0 g. of the sodium salts of the sulfuric acid esters of saturated fatty alcohols in 100 ml. of water is added whereupon the pigment is precipitated by adding 50 ml. of 2N hydrochloric acid dropwise within 10 minutes while stirring at 93°–95°. The suspension is kept for 1 hour at 95°, the precipitated pigment is filtered off, washed neutral with water, dried and pulverized. A red, finely distributed powder is obtained which, in addition to the pigmenting of stoving lacquers, is also well suited for incorporation into plasticized polyvinyl chloride and allows of the production of colorings which are fast to migration and strongly colored and have very good fastness to heat, light and weathering.

If, instead of the 2 g. given in the example, only 1 g. of the sodium salts of the sulfuric acid esters of saturated fatty alcohols and 1 g. of rosin soap are used with otherwise the procedure described in the example, then a red pigment having similar properties is obtained.

EXAMPLE 7

If, with otherwise the same procedure, instead of the solution mentioned in example 5 of 0.4 g. of the sodium salt of a condensation product of naphthalene sulfonic acid and formaldehyde in 20 ml. of water, a solution of 1.0 g. of an addition product of 18 mols of ethylene oxide to 1 mol of a technical stearyl alcohol in 50 ml. of water is used, then a red pigment is obtained which has similar properties to those given in example 5.

EXAMPLE 8

If, with otherwise the same procedure, the solution given in example 6 of 2.0 g. of the sodium salts of the sulfuric acid esters of saturated fatty alcohols in 100 ml. of water is replaced by 1.0 g. of monoglyceride of oleic acid in 50 ml. of water, then a finely distributed red pigment dyestuff is obtained which can be very well incorporated into plasticized polyvinyl chloride and yields pigmentings having great fastness to light, migration and heat. Worked into stoving lacquers, pigmentings of great purity, color strength and transparency are obtained.

EXAMPLE 9

3.92 g. of perylene-3,4,9,10-tetracarboxylic acid dianhydride are dissolved in 175 ml. of water and 25 ml. of 2N sodium hydroxide solution at 45° and 0.6 g. of an addition product of 11 mols of ethylene oxide to 1 mol of nonyl phenol, dissolved in 30 ml. of water, are added. The perylene pigment is then precipitated at 95° while stirring by the dropwise addition of 50 ml. of 2N hydrochloric acid within 10 minutes. The suspension of the precipitated pigment is kept for 1 hour at 95°, the pigment is filtered off hot, washed neutral and dried. After milling, a red powder is obtained which can be worked into plasticized polyvinyl chloride or into hard polyvinyl chloride. Reduced with white, it proves to be strongly colored, yellowish red, fast to heat and migration and has very good fastness to light and weathering.

EXAMPLE 10

A solution is prepared by heating 3.92 g. of perylene-3,4,9,10-tetracarboxylic acid dianhydride in 150 ml. of water and 25 ml. of 2N sodium hydroxide solution to 60°. A solution of 1.0 g. of the sodium salt of dibutyl naphthalene sulfonic acid in 50 ml. of water is added to the above solution. After heating to 95°, 50 ml. of 2N hydrochloric acid are added dropwise within 10 minutes while stirring. The suspension is kept for 1 hour at this temperature whereupon the pigment is filtered off, washed, dried and pulverized. In stoving lacquers, it has great color strength, outstanding fastness to overlacquering and heat and excellent fastness to light and weathering.

EXAMPLE 11

If, with otherwise the same procedure as given in example 10, instead of the solution there given of 1.0 g. of the sodium salt of dibutyl naphthalene sulfonic acid in 50 ml. of water, an emulsion of 0.45 g. of a condensation product of 1 mol of stearic acid and 2 mols of diethanolamine in 22 ml. of water is used, then a red pigment is obtained which, when worked into plasticized polyvinyl chloride, yields red pigmentings which are fast to migration and have excellent fastness to light.

EXAMPLE 12

A solution of 0.8 g. of a product, obtained by addition of 1 equivalent of styrene oxide and 9 equivalents of ethylene oxide to 1 equivalent of stearylamine and subsequent quaternization of the reaction product with dimethyl sulfate, in 8 ml.

of water is added to a 55° warm solution of 3.92 g. of perylene-3,4,9,10-tetracarboxylic acid dianhydride in 150 ml. of water and 25 ml. of 2N sodium hydroxide solution. The whole is then heated to 95° whereupon 50 ml. of 2N hydrochloric acid are added dropwise within 10 minutes while stirring, and the suspension formed is kept for another hour at 90°–95°. The pigment is then filtered off, washed neutral, dried at 80° and pulverized. A much more strongly colored red pigmenting is attained therewith in a stoving lacquer containing titanium dioxide than with a pigment produced in the same way but without the addition of the dispersing agent.

EXAMPLE 13

A soap solution, which has been produced by dissolving 0.4 g. of colophonium in 2 ml. of water and 0.19 g. of 30 percent aqueous sodium hydroxide solution at 95°, is added to a 50° warm solution of 3.92 g. of perylene-3,4,9,10-tetracarboxylic acid dianhydride in 165 ml. of water and 25 ml. of 2N sodium hydroxide solution. After heating the solution of the sodium salt of perylene-3,4,9,10-tetracarboxylic acid to 95°, 30 ml. of 2N acetic acid are added dropwise to the mixture while stirring and the pigment suspension obtained is heated for another hour at 93°–95°. The pigment is then filtered off, washed with water, dried at 70° and pulverized.

On working into stoving lacquers, brown pigmentings are obtained which have great color strength, transparency and very good fastness to light, overlacquering and weathering.

If in the above example, instead of the 30 ml. of 2N acetic acid, equivalent amounts of p-toluene sulfonic acid are used and otherwise the procedure given in the example is followed, then a brown pigment having similar fastness properties is obtained.

EXAMPLE 14

0.4 g. of colophonium, which has been dissolved at 95° in 2 ml. of water and 0.19 g. of 30 percent aqueous sodium hydroxide solution, are added to a 30° warm solution of the sodium salt of perylene-3,4,9,10-tetracarboxylic acid, obtained by adding 3.92 g. of perylene-3,4,9,10-tetracarboxylic acid dianhydride to 160 ml. of water and 2 g. of sodium hydroxide. At 30°, 50 ml. of 2N hydrochloric acid are added dropwise within 10 minutes while stirring whereupon the suspension obtained is stirred for another hour at 30°–32°. The precipitated pigment is then filtered off, washed with water, dried at 30°–33° and pulverized.

On working into stoving lacquers, a brown-red pigmenting having good color strength and transparency as well as very good fastness to light and overlacquering is obtained with this pigment.

EXAMPLE 15

3.92 g. of perylene-3,4,9,10-tetracarboxylic acid dianhydride are dissolved in a mixture of 145 ml. of water and 24 ml. of 2N sodium hydroxide solution and while stirring 0.4 g. of a condensation product of 1 mol of coconut fatty acid and 2 mols of diethanolamine is added. The reaction mixture is heated to 85°. 28.8 ml. of 2N hydrochloric acid are added dropwise during 10 minutes. The pigment suspension which has thus been acidified with mineral acid, is then heated during 30 minutes to 95°–97°, the pigment is subsequently filtered while hot, washed neutral, dried at 100° and then pulverized. The pigment possesses a good transparency in stoving lacquer and in reduction with white a pure red shade of great color strength having very good fastness to overlacquering heat, light and weathering.

Pigments having similar properties are obtained when the 0.4 g. of the condensation product of 1 mol of coconut fatty acid and 2 mols of diethanolamine is replaced by the same amount of the dispersing agents listed in the following table and otherwise the procedure given in this example is followed.

TABLE

Dispersing agent addition product of ethylene oxide and lauric acid amide
sulfated castor oil
sodium salt of dioctyl sulfo succinate
nonylphenol-diglycol ether sulfate
sodium salt of sulfuric acid ester of coconut fatty acid-hydroxyethyl amide

EXAMPLE 16

A stoving lacquer based on acrylic resin was produced with a binder of the following composition:

79.5 g. of polyacrylate resin 1474 (50 percent solution of a polymethacrylate-acrylamide resin in a butanol/xylene mixture, produced by Reichhold Chemie, Hausen AG, Switzerland),
+3.4 g. of dioctyl phthalate,
3.4 g. of polymer plasticizer P 206 (higher molecular ester containing epoxyd and a slight amount of unsaturated groups, produced by Reichhold Chemie, Hausen AG, Switzerland,
+13.7 g. of Super-Beckamin 852 (about 50 percent solution of a butylated melamin-formaldehyde resin in a butanol/xylene mixture, produced by Reichhold Chemie, Hausen AG, Switzerland),
=100.0 g. of colorless stoving lacquer.

79.5 g. of this lacquer and 20 g. of titanium dioxide RN57 (Rutil, produced by Titangesellschaft, Leverkusen, Germany) and 0.5 g. of Bentone 34 (dimethyl-dioctadecyl ammonium bentonite, produced by National Lead Co., New York, USA) were worked up into a white lacquer. Also, 90 g. of the colorless lacquer were finely milled in a ball mill with 5 g. of red pigment produced according to example 1. 1.5 g. of the red lacquer so obtained were then intimately mixed with 39.6 g. of the white lacquer and the mixture was sprayed onto aluminum sheet, a mixture of 80 ml. of xylene and 20 ml. of ethyl cellosolve having been used to attain the most favorable spraying viscosity. After drying, the lacquer was stoved for 30 minutes at 140°.

The red lacquer obtained proved to be fast to overlacquering and heat. It also had excellent fastness to light and weathering which, in view of the very slight content of red pigment in the lacquer applied, is particularly remarkable. Also the color strength is very high for a red pigment in this dilution.

If in the above example, instead of the 5 g. of red pigment according to example 1, 5 g. of brown pigment according to example 13 are used with otherwise the procedure given in the example, then a strongly colored, brown, transparent lacquer having similar properties is obtained.

EXAMPLE 17

To produce a metal-effect finish a binder of the following composition was used:

50 g. of Beckosol 230, 60 percent in xylene (alkyd resin modified with coconut oil fatty acid having 32 percent content of coconut oil fatty acid, produced by Reichhold Chemie, Hausen AG, Switzerland),
+30 g. of Super-Beckamin 852 (produced by Reichhold Chemie, Hausen AG, Switzerland),
+10 g. of xylene,
+10 g. of methyl cellosolve,
=100 g. of colorless stoving lacquer.

Two hundred eighty-eight grams of this lacquer were mixed with 12 g. of red pigment produced according to example 1 and the mixture was finely milled in a ball mill.

Finally, 21 g. of the colorless stoving lacquer were mixed with 1.5 g. of Stapa 44 NL, produced by Eckart-Werke, Fuerth, Bavaria, Germany (aluminum bronze) and 7.5 g. of the red-pigmented lacquer. The metal-effect finish obtained was sprayed onto aluminum sheet, it having been diluted with xylene to attain the most favorable viscosity. After drying at room temperature, the lacquering was stoved for 30 minutes at 120°. It had a transparent metallic red shade and, in spite of the very slight content of red pigment, it had excellent fastness to weathering.

EXAMPLE 18

Sixty-seven grams of polyvinyl chloride powder (suspension polymer), 33 g. of dioctyl phthalate, 2 g. of dibutyl tin dilaurate, 0.3 g. of a light stabilizer (sodium-barium-organophosphate), 7.0 g. of titanium dioxide (Anatas) and 0.7 g. of perylene-3,4,9,10-tetracarboxylic acid dianhydride, produced according to example 1, are mixed and the mixture is worked up for 10 minutes on a 160° hot set of mixing roller. A film of 0.4 mm. thickness is then produced in a calendar. It is very fast to light and is colored a beautiful red shade. The pigmenting is stable to heat and fast to migration.

I claim:

1. A process for the production of strongly colored, pure and transparent perylene pigment consisting of the anhydride of perylene-3,4,9,10-tetracarboxylic acid, comprising dissolving crude perylene-3,4,9,10-tetracarboxylic acid anhydride pigment in an aqueous alkaline solution to produce the alkali salt of perylene-3,4,9,10-tetracarboxylic acid, adding a dispersing agent and precipitating the anhydride by the addition of an acid, wherein the precipitation is performed at 20°–100° C. and wherein said dispersing agent is present in the aqueous solution in an amount of at least 0.2 percent by weight, calculated on the weight of the perylene-3,4,9,10-tetracarboxylic acid.

2. A process as described in claim 1, wherein the precipitation is performed at 70°–100° C.

3. A process as described in claim 2, wherein the acid is a mineral acid.

4. A process as described in claim 2, wherein the acid is an organic acid.

5. A process as described in claim 1, wherein the dispersing agent is an anion-active or a nonionic dispersing agent or a mixture of both.

6. A process as described in claim 5, wherein the dispersing agent is a soap or a sulfate of a higher alkanol.

7. A process as described in claim 6, wherein said dispersing agent is rosin soap.

8. A process as described in claim 5, wherein said dispersing agent is a monoglyceride of a fatty acid having 12 to 18 carbon atoms, or a polyglycol monoalkyl-phenyl ether having 2 to 20 glycol units and the alkyl group of which contains eight to 12 carbon atoms.

9. A process as described in claim 1, wherein the dispersing agent is present in the aqueous solution in an amount of 2 to 40 percent by weight, calculated on the weight of the perylene-3,4,9,10-tetracarboxylic acid.

10. A process as described in claim 1, wherein the dispersing agent is present in the aqueous solution in an amount of 10 to 20 percent by weight, calculated on the weight of the perylene-3,4,9,10-tetracarboxylic acid.

11. A process as described in claim 1, wherein said aqueous solution has a pH-value of at least about 7.

12. A process as described in claim 1, wherein said aqueous solution has a pH-value of about 10 to 14.

13. A strongly colored, pure and transparent perylene pigment produced by the process of claim 1.

* * * * *